(12) United States Patent
Buhrman et al.

(10) Patent No.: US 8,588,748 B2
(45) Date of Patent: *Nov. 19, 2013

(54) SYSTEM AND METHOD FOR MOBILE IDENTITY PROTECTION OF A USER OF MULTIPLE COMPUTER APPLICATIONS, NETWORKS OR DEVICES

(75) Inventors: Michael F. Buhrman, North Bend, WA (US); Randall A. Snyder, Las Vegas, NV (US); Charles L. Dennis, Sammamish, WA (US); Robert C. Boxberger, Pleasanton, CA (US); William M. Ferguson, San Diego, CA (US)

(73) Assignee: Finsphere Corporation, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/303,809

(22) Filed: Nov. 23, 2011

(65) Prior Publication Data

US 2012/0144498 A1 Jun. 7, 2012

Related U.S. Application Data

(63) Continuation of application No. 12/332,878, filed on Dec. 11, 2008, now Pat. No. 8,116,731.

(60) Provisional application No. 61/058,621, filed on Jun. 4, 2008, provisional application No. 61/027,892, filed on Feb. 12, 2008.

(51) Int. Cl.
*H04W 12/08* (2009.01)
(52) U.S. Cl.
USPC .............. 455/411; 455/410; 713/168; 726/26

(58) Field of Classification Search
USPC ................... 455/410, 411, 432.1, 433, 456.1; 726/26; 713/168
See application file for complete search history.

(56) References Cited

U.S. PATENT DOCUMENTS

| 7,715,824 | B2 * | 5/2010 | Zhou .......................... 455/412.1 |
| 7,995,994 | B2 * | 8/2011 | Khetawat et al. ............. 455/410 |
| 8,116,731 | B2 * | 2/2012 | Buhrmann et al. ........... 455/410 |
| 8,280,348 | B2 * | 10/2012 | Snyder et al. ................ 455/410 |
| 8,374,634 | B2 * | 2/2013 | Dankar et al. ............. 455/456.6 |
| 2002/0107018 | A1 * | 8/2002 | Nakamura et al. ............ 455/433 |
| 2008/0091944 | A1 * | 4/2008 | von Mueller et al. ......... 713/168 |
| 2008/0165060 | A1 * | 7/2008 | Songer et al. ................ 342/451 |
| 2012/0030771 | A1 * | 2/2012 | Pierson et al. .................. 726/26 |

* cited by examiner

*Primary Examiner* — Kamran Afshar
*Assistant Examiner* — Khawar Iqbal
(74) *Attorney, Agent, or Firm* — Foster Pepper PLLC; Richard T. Black; P. G. Scott Born

(57) ABSTRACT

An automated system and method for authenticating entities or individuals engaging in automated or electronic transactions or activities such as financial transactions, accessing computer applications, computer software, data networks or other automated or electronic devices requiring identity verification is provided. A unique Personal Identity Value is computed and stored in an Identity Register for the entity or individual and may be used for a variety of applications including recognizing incidents of identity theft. This Personal Identity Value is based on one or more computer logic resources that incorporate the relationship among a variety of identification information elements and parameters associated with the entity or individual, such as the entity's or individual's wireless device location, the entity's or individual's home location, other associated locations, automated activities engaged in and applications accessed.

8 Claims, 8 Drawing Sheets

EXEMPLARY WIRELESS DEVICE ID DATABASE

140

| Wireless Device ID (MDN) 141 | Wireless Location 142 | Wireless Geographic Place 143 | Wireless Location Date:Time 144 | Application ID 145 | Personal Identity Value 146 | Historical Personal Identity Values 147 |
|---|---|---|---|---|---|---|
| +1-702-555-0000 | MSC ID | Geographic Name, ID or Coordinates | 09-26-2008 12:34:56 | Application 1 [Event 1\|Location\|Date,Time] [Event n\|Location\|Date,Time] Application n [Event 1\|Location\|Date,Time] [Event n\|Location\|Date,Time] | 903 | Date,Time: 842 / Date,Time: 765 / Date,Time: 518 / Date,Time: 922 / Date,Time: 419 / ... |
| +1-702-555-1234 | Cell Site ID | Geographic Name, ID or Coordinates | 09-27-2008 22:45:07 | Application 1 [Event 1\|Location\|Date,Time] [Event n\|Location\|Date,Time] Application n [Event 1\|Location\|Date,Time] [Event n\|Location\|Date,Time] | 684 | Date,Time: 684 / Date,Time: 664 / Date,Time: 532 / Date,Time: 366 / Date,Time: 493 / ... |
| +1-206-555-1111 | Latitude/ Longitude | Geographic Name, ID or Coordinates | 09-26-2008 16:34:56 | Application 1 [Event 1\|Location\|Date,Time] [Event n\|Location\|Date,Time] Application n [Event 1\|Location\|Date,Time] [Event n\|Location\|Date,Time] | 312 | Date,Time: 203 / Date,Time: 453 / Date,Time: 467 / Date,Time: 502 / Date,Time: 384 / ... |
| +1-425-555-0000 | Other Coordinates | Geographic Name, ID or Coordinates | 09-26-2008 09:11:49 | Application 1 [Event 1\|Location\|Date,Time] [Event n\|Location\|Date,Time] Application n [Event 1\|Location\|Date,Time] [Event n\|Location\|Date,Time] | 496 | Date,Time: 500 / Date,Time: 506 / Date,Time: 438 / Date,Time: 526 / Date,Time: 516 / ... |
| ... | ... | ... | ... | ... | ... | ... |

| Wireless Device ID (MDN) | Home Address | Work Address | Phone 1 | Phone 2 | Related Locations | | Related Entries (related Wireless Device IDs) |
|---|---|---|---|---|---|---|---|
| +1-702-555-0000 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-702-555-1234 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-206-555-1111 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| +1-425-555-0000 | Address, City, State, Postal Code, Country | Address, City, State, Postal Code, Country | CC-NDC-SN | CC-NDC-SN | Loc 1 / Loc 3 | Loc 2 / Loc n | CC-NDC-SN |
| ... | ... | ... | ... | ... | ... | ... | ... |

EXEMPLARY IDENTITY DATABASE

FIG. 4

| Application ID | Identity Data | | Logic Resource |
|---|---|---|---|
| Application 1 | Location | Weighting Factor | Logic Resource W |
| | Home | Value 1 | |
| | Work | Value 2 | |
| | Phone1 | Value 3 | |
| | Phone2 | Value 4 | |
| | Loc 1 | Value 5 | |
| | Loc n | Value n | |
| Event 1 — Weighting Factor | | | |
| Event n — Weighting Factor | | | |
| Application 2 | Location | Weighting Factor | Logic Resource X |
| | Home | Value 1 | |
| | Work | Value 2 | |
| | Phone1 | Value 3 | |
| | Phone2 | Value 4 | |
| | Loc 1 | Value 5 | |
| | Loc n | Value n | |
| Event 1 — Weighting Factor | | | |
| Event n — Weighting Factor | | | |
| Application 3 | Location | Weighting Factor | Logic Resource Y |
| | Home | Value 1 | |
| | Work | Value 2 | |
| | Phone1 | Value 3 | |
| | Phone2 | Value 4 | |
| | Loc 1 | Value 5 | |
| | Loc n | Value n | |
| Event 1 — Weighting Factor | | | |
| Event n — Weighting Factor | | | |
| Application n | Location | Weighting Factor | Logic Resource Z |
| | Home | Value 1 | |
| | Work | Value 2 | |
| | Phone1 | Value 3 | |
| | Phone2 | Value 4 | |
| | Loc 1 | Value 5 | |
| | Loc n | Value n | |
| Event 1 — Weighting Factor | | | |
| Event n — Weighting Factor | | | |

EXEMPLARY IDENTITY RISK CONFIGURATION

FIG. 5

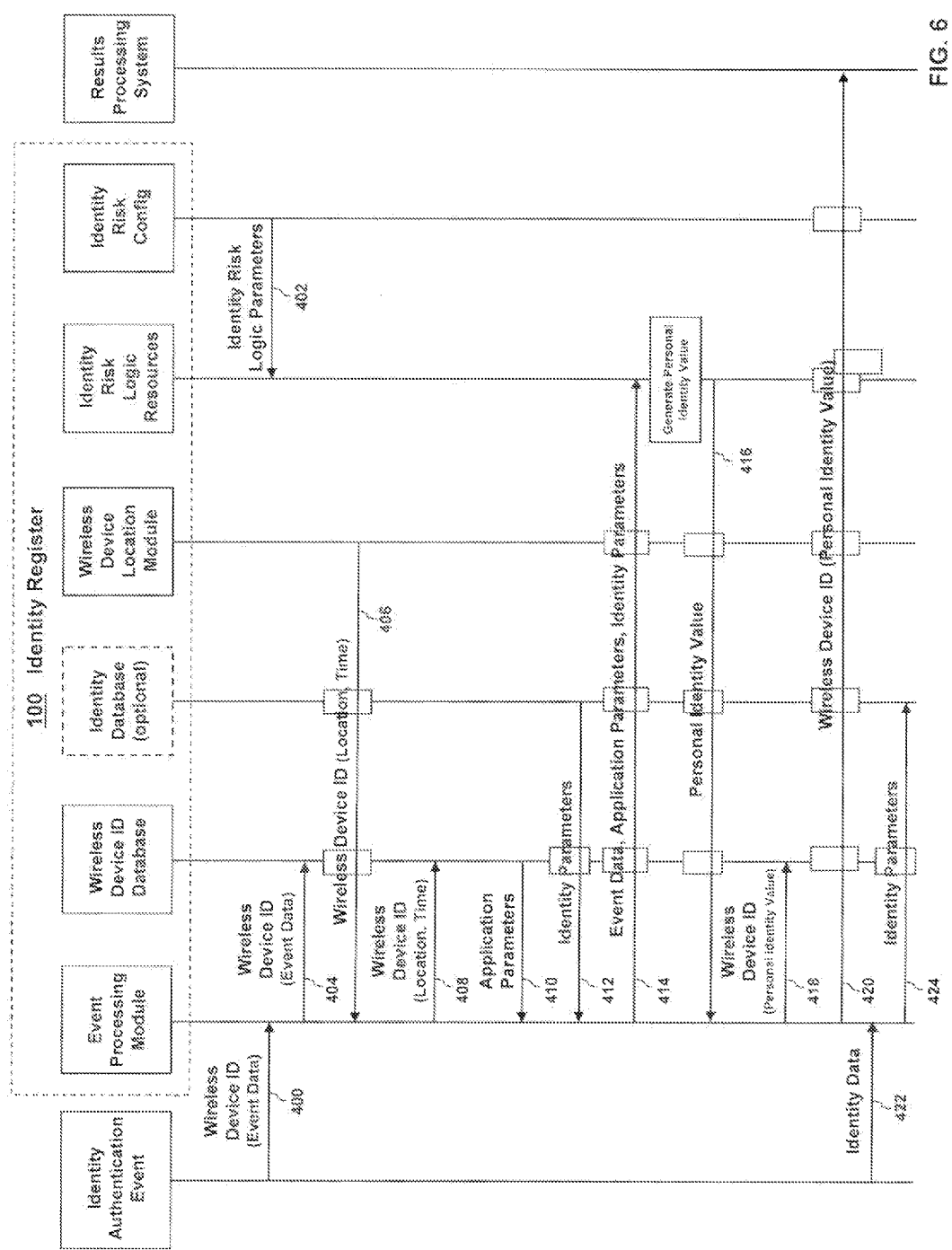

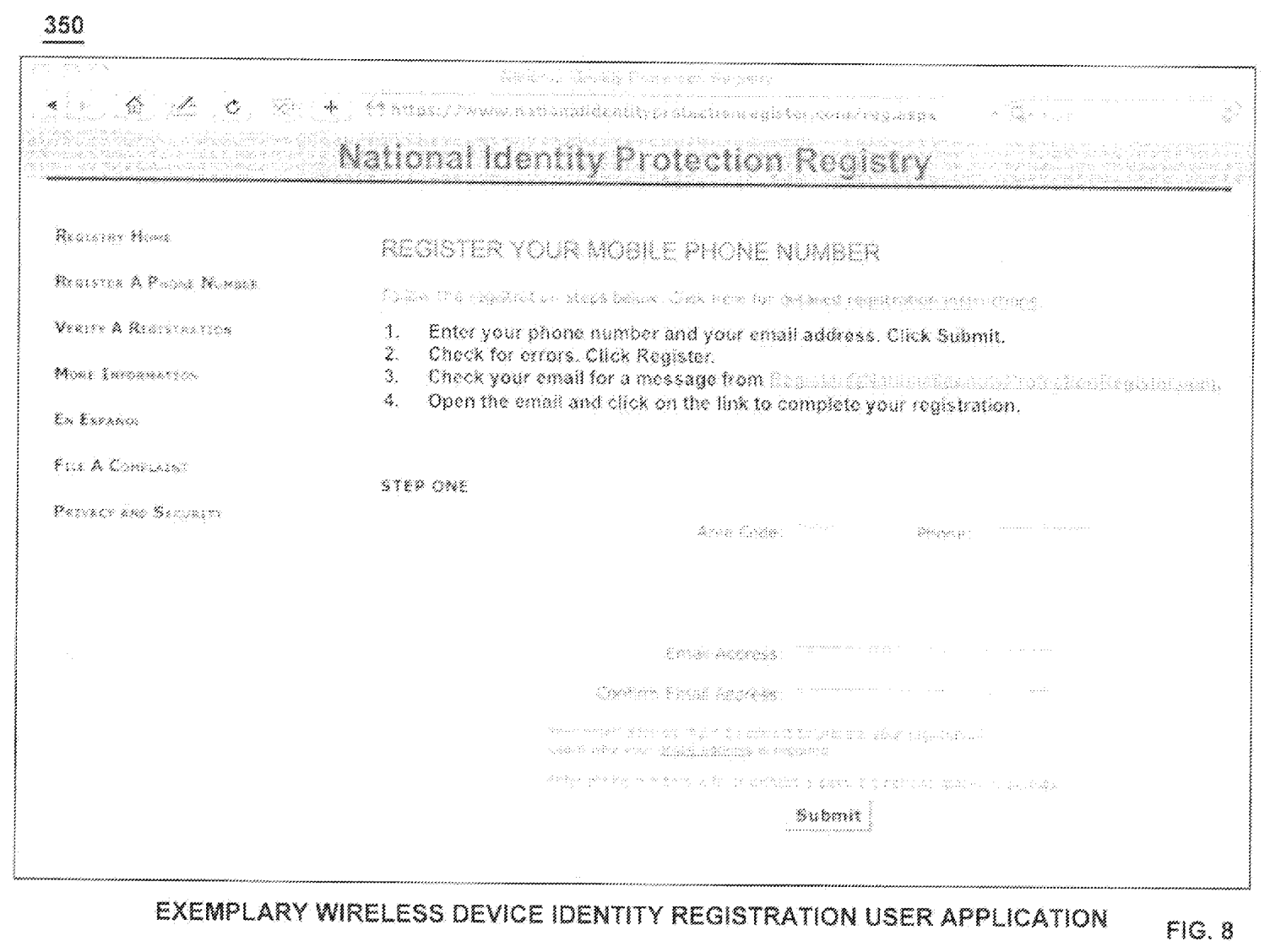

EXEMPLARY WIRELESS DEVICE IDENTITY REGISTRATION USER APPLICATION    FIG. 8

SYSTEM AND METHOD FOR MOBILE IDENTITY PROTECTION OF A USER OF MULTIPLE COMPUTER APPLICATIONS, NETWORKS OR DEVICES

CROSS REFERENCE TO RELATED APPLICATIONS AND PATENTS

This application is a continuation of and claims priority to and benefit of U.S. patent application Ser. No. 12/332,878, now U.S. Pat. No. 8,116,731, filed on Dec. 11, 2008 which in turn claims the benefit of U.S. Provisional Patent Application No. 61/058,621 filed on Jun. 4, 2008 and also claims the benefit of U.S. Provisional Patent Application No. 61/027,892 filed on Feb. 12, 2008. The foregoing applications are incorporated herein by reference.

U.S. application Ser. No. 11/933,803, for "Automated Analysis Comparing Wireless Device Location With Another Geographic Location," By Dankar et al. filed Nov. 1, 2007.

PCT Application No. PCT/IL2006/000775, International Publication No. WO 2007/004224 A1 for "Improved Location Based Authentication System," by Eden et al. filed Jul. 5, 2006.

U.S. Pat. No. 5,819,226 for "Fraud Detection Using Predictive Modeling," by Gopinathan et al. issued Oct. 6, 1998.

All incorporated herein by reference.

BACKGROUND OF THE INVENTION

1. Technical Field of the Invention

This invention relates generally to the detection of identity theft based on fraudulent use of, or fraudulent access to, computer applications, networks, systems and devices, and more particularly to an automated system and method that uses an "Identity Register" incorporating processing logic and a database to develop, maintain and refine a Personal Identity Value representing an entity whose identity requires some form of authentication.

2. Description of the Related Art

In the following discussion, the terms "activity" and "transaction" are used for illustrative purposes. In general, activities relate to automated or electronic interactions with hardware devices or software programs, such as accessing computer systems or online web sites. Transactions relate to automated or electronic transactions, such as personal data transactions or financial transactions such as payments, fund-transfers, fund withdrawals, deposits, changes to account information, etc. Also, the term "entity" is used for illustrative purposes. In general, entities requiring authentication are individuals, data subjects or any electronic or computing devices that may be a subject whose identity requires some form of identity authentication.

Accurate authentication of the identity of users or entities engaged in automated activities or transactions requiring security is a problem that continues to grow. Many solutions have been introduced to detect or prevent unauthorized access to secure hardware and software systems that attempt to determine through various means if an entity engaging in a transaction or accessing a computer or application is the lawful and rightful user. Identity theft has become more and more pervasive and does not only facilitate financial fraud. It may be perpetrated against any computer applications, systems and services that require security and where identity authentication is needed.

There are generally two recognized categories of identity theft that are perpetrated against legitimate users of automated or electronic transactions and activities. The first is known as "financial identity theft" and is typically based upon the use of another's identity to obtain goods and services. The second, known as "identity deception" is generally based upon the use of another's identity or identifying information to intentionally deceive others.

A classic example of financial identity theft, typically synonymous with bank fraud, occurs when an offender obtains a loan from a financial institution by impersonating someone else. The offender pretends to be the victim by presenting an accurate name, address, birth-date or other information the lender requires to establish identity. Even if this information is checked against data at a national credit-rating service, the lender encounters no concerns, as all of the victim's information matches the records. The lender has no easy way to discover that the person is pretending to be the victim, especially if an original, government-issued ID can't be verified, as is the case in online, mail, telephone and fax-based transactions. The offender keeps the money from the loan, the financial institution is never repaid and the victim is wrongly blamed for defaulting on a loan never truly authorized.

Another example of financial identity theft is when an offender obtains another's credit card or debit card account information, such as account number, account expiration date, card verification value or other data associated with an individual's credit card account. The offender then uses the information to create a counterfeit card or otherwise make purchases of goods and services at a point-of-sale, withdraw funds at an automatic teller machine or use the account information to make purchases over the telephone or via online web sites.

In most cases, financial identity theft is reported to a national consumer credit reporting agency or credit bureau as a collection or bad loan under the impersonated individual's record. The victim may discover the incident by being denied a loan, seeing the accounts, viewing their own financial transactions and history or by being contacted by creditors or collection agencies. The victim's credit score, which affects their ability to acquire new loans or credit lines, and rates on existing accounts may be adversely affected until they are able to successfully dispute the complaints and have them removed from their record. Other forms of financial fraud associated with identity theft include account takeovers, passing bad checks and "busting out" an account. A bust out is a sudden withdrawal of all available funds associated with deposit fraud. If withdrawals or checks are made against the impersonated individual's real accounts, that individual may need to convince the bank that the withdrawal was fraudulent or file a court case to retrieve lost funds. If checks are written against fraudulently opened checking accounts, the person receiving the checks will suffer the financial loss. However, the recipient of a check might attempt to retrieve money from the impersonated individual by using a collection agency. This activity would appear in the victim's credit history until the check was shown to be fraudulent.

Impersonating another's identity to deceive, for reasons other than financial gain, also has far-reaching consequences. Preventing identity deception has application to many circumstances where individual security is a primary concern. For example, the ability to authenticate the identity of an individual to prevent deception has application to law enforcement, public security, cyber crime and any online means where individuals have an expectation that existing security measures are adequate.

Identity deception occurs, for example, when an individual obtains someone else's electronic login information for access to a web-based online application such as a social networking web site. The individual successfully enters a username and password that belongs to the victim. Once accepted by the application, that individual has access to the victim's personal profile information and application features. Furthermore, the individual can establish and maintain communications with the victim's friends and family. The victim's personal profile information can be modified or deleted and other damage can be inflicted upon the victim for malicious purposes. Criminals, parolees and online predators can make use of the victim's identity for dangerous and deceptive purposes.

Credit card issuers and financial institutions, such as banks, attempt to limit financial identity theft and fraud losses by analyzing a variety of data and information associated with, for example, an automated credit card transaction. Rules-based "parameter analysis" is used along with pattern recognition and probabilistic techniques to determine the legitimacy of a card transaction. Parameter analysis techniques are used to examine, for example, the number of credit card transactions on a particular account within a specified period of time, say 24 hours, and the dollar amount of the transaction. If the number of transactions or the dollar amount exceed some pre-defined threshold, the transaction can be flagged as potentially fraudulent and further action can be taken. This action may be as drastic as denying the transaction and blocking the card holder's account. Parameter analysis, however, often times yields false-positive results, where the financial transaction is in fact legitimate, but falls outside the parameter thresholds set.

Probabilistic, or predictive, techniques include the use of statistical analysis and pattern recognition using many more parameters than are typically used in rules-based parameter analysis. Probabilistic techniques require the construction of behavioral models based on potentially hundreds of parameters to provide a probability that a particular financial transaction is fraudulent. These parameters typically include detailed data about multiple card holders, multiple merchants, multiple transactions and transaction histories that provide the ability to filter, screen and isolate those financial transactions which are likely to be fraudulent. Over time, this aggregated and detailed data about transactions are used to enhance the statistical model so patterns emerge. Thus, the statistical model is continually refined so that a particular transaction, when processed through the model, results in a more accurate determination of the likelihood of fraud.

Probabilistic techniques and models to determine incidents of identity theft may be made more beneficial if a Personal Identity Value representing an individual user's characteristics is developed, rather than statistical models based on pattern recognition from many users' transaction characteristics. That is, authenticating the identity of an entity engaged in an automated activity or transaction has utility above and beyond systems that determine the likelihood that a transaction itself is fraudulent. It is desirable, therefore, to have an automated system that uses discrete available data regarding the entity, including the entity's wireless device location data, home location data and other Identity Data to create a Personal identity Value for the entity that may be accessed by a variety of applications that require identity authentication. By using this method, false-positive indications of fraudulent activity may be further reduced.

The primary identifying characteristic of a particular wireless device is the dialable mobile directory number (MDN). The MDN can be up to 15 digits long and is a unique number worldwide among all wireless devices, regardless of country or telecommunications network operator. The format of the MDN has been standardized as the E.164 International Public Telecommunication Number by the International Telecommunications Union, a standards making organization within the United Nations. Because the MDN is unique worldwide to an entity's or individual's mobile service subscription and wireless device, it can be considered an extension of the unique identity of that wireless device's user.

Much of the utility of using an entity's or individual's wireless device as an extension of the identity of the user is enabled by the physical security of wireless devices. Wireless devices are inherently secure due to the properties of digital cellular telecommunications. Digital cellular technology has replaced analog cellular technology worldwide and with this advancement came cellular authentication. Cellular authentication uses a cryptographic security protocol and public key infrastructure that is only made possible by digital communications technology. This cryptographic security protocol prevents a mobile directory number from being used by any wireless device other than the one for which it was originally programmed. The only way to re-use a mobile directory number with another device is by special secure provisioning performed within secure network platforms by the wireless network operator. When this secure provisioning occurs, the mobile directory number is securely and solely associated with the device for which it is used. In the case of GSM networks, the secure wireless device is the subscriber identity module, or SIM card, which is associated with an individual and unique mobile service subscription. This is why a SIM card can be used in any GSM-based mobile phone without notifying the wireless network operator. In the case of COMA networks, the wireless device is the mobile phone itself as SIM cards are not commercially supported.

SUMMARY OF THE INVENTION

An object of the present invention is to provide a system and its methods of use, for detecting identify theft using one or more logic resources to evaluate entities based on parameters about the entity and a wireless device associated with an entity.

Another object of the present invention is to provide a system, and its methods of use, for detecting identify theft by having an entity's wireless device be representative of the entity's true identity.

Yet another object of the present invention is to provide a system, and its methods of use, for detecting identify theft that employs an analysis to revise and refine a Personal Identity Value used to allow or deny access or operation of a computer application, activity, network, system or device for current or subsequent access or operation of said computer application, activity, network, system or device.

Still another object of the present invention is to provide a system, and its method of use, for detecting identify theft by updating and revising a Personal Identity Value for an entity and thereafter reporting to another system wanting to determine at some point in time what the Personal Identity Value is.

Yet another object of the present invention is to provide a system, and its method of use, for detecting identify theft in response to a Personal Identity Value based on a transaction or activity event data, the location of the transaction or activity event, the entity's home location, the location of the entity's wireless device and the time the location of the entity's wireless device was obtained.

Yet another object of the present invention is to provide a system, and its method of use, for detecting identity theft based on location analysis of a multiplicity of provided and stored locations, historical locations, historical Personal Identity Values and the velocities required to travel among the provided and stored locations.

These and other objects of the present invention are achieved in, a method for detecting identity theft of an individual based on one or more types of Identification Data, Event Data or both including the location of a wireless device associated with an entity obtained from a Wireless Network, the entity's home location, other locations associated with an entity, automated activity data, automated transaction data or automated event detection data. Data is obtained regarding an automated transaction or activity from a data network. A unique identifier representing an individual is determined. The location of an automated transaction or activity is determined. The entity's home location is determined. The wireless device location associated with an entity is obtained from a wireless network. A Personal Identity Value is generated based on the transaction or activity event data, the location of the transaction or activity event, the entity's home location, the location of the entity's wireless device and the time the location of the entity's wireless device was obtained.

In another embodiment of the present invention, a method is provided for registering an entity with an Identity Register based on an entity's Wireless Device Identification (ID). An entity's unique Wireless Device ID is provided via a data network. An entity's home location identification data is provided via a data network. An entity's obtained Identification Data is then stored.

In another embodiment of the present invention, an apparatus is provided for detecting identity theft of an entity based on an the location of a wireless device associated with an entity obtained from a Wireless Network. A module provides data regarding a transaction or activity from a data network. A module is used to obtain a unique identifier representing an entity. A module determines the location of a transaction or activity. A module obtains the individual's home location. A module obtains a wireless device location associated with an entity from a Wireless Network. A module generates a Personal Identity Value based on the entity's Identity Data, Event Data, the location of an automated event or activity, the entity's home location, the location of a wireless device associated with an entity and the time the location of the wireless device was obtained.

In another embodiment of the present invention, an apparatus registers an entity with an Identity Register based on an entity's Wireless Device ID. The apparatus includes an application to obtain an entity's unique Wireless Device ID from a data network, an application to obtain an entity's home location or other Identification Data from a data network and a database to store an entity's obtained Identification Data and a database to store an entity's obtained Event Data.

BRIEF DESCRIPTION OF THE DRAWINGS

FIG. 3 depicts an exemplary Wireless Device ID Database used to associate unique Wireless Device IDs with derived wireless device locations, identity authentication applications and Personal Identity Values.

FIG. 4 depicts an exemplary Identity Database used to store unique Wireless Device IDs associated with other Identity Data associated with an entity or individual.

FIG. 5 depicts exemplary Identity Risk Configuration data used by, or associated with, one or more Identity Risk Logic Resources.

FIG. 6 depicts an exemplary information flow diagram of the Identity Register.

FIG. 8 depicts an exemplary web-based Wireless Device Identity Registration user application.

DETAILED DESCRIPTION

Figure 1:
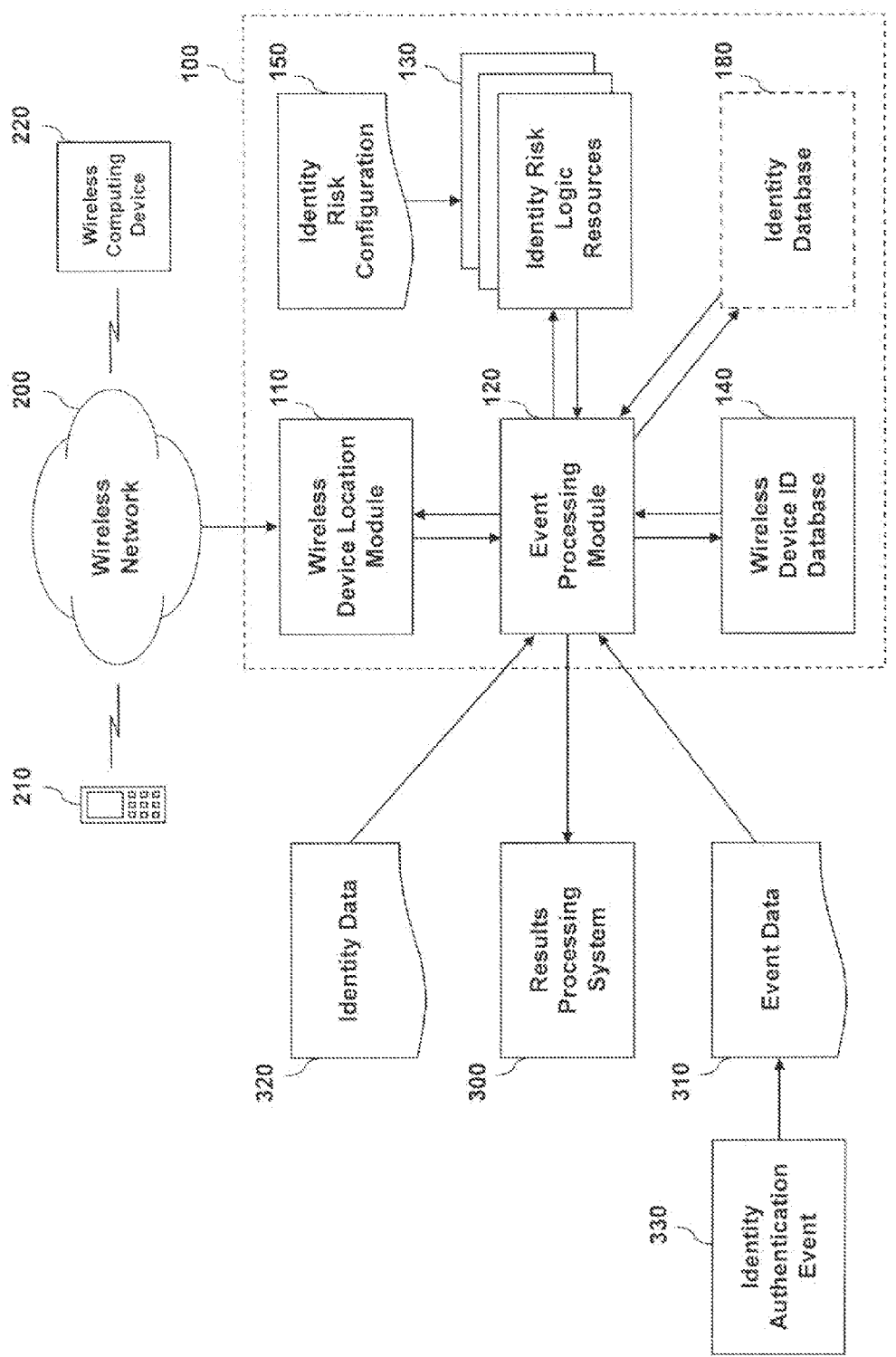
FIG. 1 depicts the functional entities and modules of an exemplary Identity Register used to calculate and provide a Personal Identity Value for an identity authentication application. Included in the example is an Event Processing Module, a Wireless Device Location Module, a Wireless Device ID Database, an optional Identity Database, one or more Identity Risk Logic Resources and Identity Risk Configuration data in accordance with the principles of the present invention.

In accordance with the present invention, there is provided an automated system and method for detecting identity theft, which uses one or more Identity Risk Logic Resources to evaluate wireless device users based on parameters about the wireless device and its user. These parameters enable the system to estimate a probability that an entity engaged in a particular automated transaction or activity is not, in fact, the entity authorized to do so. The probability is distinguished as a Personal Identity Value that may be provided as output to other automated systems or to a human decision-maker involved in determining the validity of an entity or individual engaged in an automated transaction or activity. The Personal Identity Value associated with an entity may be revised based on subsequent transactions or activities engaged in by the entity (i.e. the wireless device user) to designate a more accurate value that may be used for a variety of applications.

In one embodiment of the present invention, an entity's wireless device is representative of the entity's true identity. The use of the wireless device for identity authentication is a robust way of ensuring the true identity of entities accessing a computer application or system. Based on pervasive use of cell phone technology worldwide, it is surmised that an entity's or individual's unique mobile device associated with a unique mobile directory number (MDN) is a reasonable proxy for the identity and current location of the wireless device's owner. In this way, a wireless device can become a strong mechanism for fighting fraud and identity theft that may be perpetrated against the user, computer applications or electronic transactions. This is due to the fact that an individual's mobile phone is almost always on and with the individual, and the location of the mobile phone is derived from the Wireless Network or from some local wireless or wireline connection to some other automated system.

In one embodiment, an entity's or individual's wireless device is active, powered on and communicates with a Wireless Network, local wireless communications link or local wired communications link. The wireless device is in close proximity to a computer application network, system or device. Depending on the particular application, network, system or device, close proximity can be anywhere from several miles to several feet. The entity's or individual's wireless device MDN is provided and stored in an Identity Register. An identity authentication application or system is associated with and uses the functions and processes of the Identity Register. When the entity or individual comes into some proximity (as previously defined) of a computer application, network or device, or otherwise attempts to invoke a computer application, network or device, either himself or via some external communications mechanism, that requires identity authentication for access and operation, the Identity Register records and stores this invocation event. An identity authentication application supported by the Identity Register attempts to authenticate the user for that computer application, network or device. The Identity Risk Logic Resources used may be provided by the Identity Register or by an external computer application itself. These logic resources are typically defined by distance and time parameters along with past identity authentication events that may also be based on distance and time or other means of authentication. The use of or actual respective logic resources, processes and computer applications used and pertaining to the identity authentication invocation events involved are recorded and stored at the Identity Register. The result, in the form of a Personal Identity Value, of the identity authentication application process are also stored. The continuing storage of identity authentication invocation events, processes, functions, logic resources and results associated with a particular and previously registered entity or individual may be used for analysis of subsequent identity authentication invocation events and processes. This analysis may be used to revise and refine a Personal Identity Value used to allow or deny access or operation of a computer application, activity, network, system or device for current or subsequent access or operation of said computer application, activity, network, system or device.

One embodiment of the present invention comprises identity authentication of an entity or individual wireless device user engaged in a secure automated transaction or activity based on the location of the user's wireless device. A Wireless Device Location Module is used to obtain the location of the wireless device from a macro Wireless Network, such as a cellular network or WiMAX network. The unique and identifying mobile directory number (MDN) has been initially registered, provided and stored in an external database or within the Identity Register that maintains Identity Data in a Wireless Device Identity (ID) Database and associated processing system. The Identity Register acts as the supporting system and database of record for identity authentication by receiving, detecting, recording, processing and storing identity Event Data or other data that lead to an identity authentication application or process. The Wireless Device ID Database records events based on user interaction, directly or indirectly, with the Identity Register system. Electronic triggers may originate from application events based on stored Identity Data or the proximity of a wireless device supporting automated and unsolicited communications with the system. The Wireless Device ID Database is used to maintain a Personal Identity Value for each entity or individual and unique Wireless Device ID. This value is initially generated by one or more Identity Risk Logic Resources and may be updated and revised based on subsequent events associated with the Wireless Device ID. As a non-limiting example, these events may be in the form of a local wireless communication with the system (such as a wireless device-based Bluetooth or WiFi connection to a computer), a local wired connection (such as a USB or FireWire® connection to a computer), the internet protocol (IP) address location of a computer user sending an email, a log-in function for a web site, a financial transaction event trigger such as the use of a credit card at an automatic teller machine or point-of-sale location, and the like. Over a given period of time, a user associated with a wireless device may trigger events that are associated with, connected to and recorded within the Identity Register. These events may cause the Personal Identity Value to be updated and revised for the particular wireless device and may be reported to another entity wishing to determine at some point in time what the Personal Identity Value is. Furthermore, the Personal Identity Value may be used to subsequently take some action for a particular transaction or activity associated with a wireless device user such as determining whether an activity or transaction engaged in by the wireless device user is likely fraudulent or not.

The wireless device user's Identity Data may be initially registered and created in a variety of ways, both directly and indirectly. One preferred embodiment of direct registration occurs when an individual enters identity information into a form on a web page presented by a registration application supported by the Identity Register. Identity information may contain a username, password, given name, address, sex, age, email address or various other information and the required and unique mobile directory number (MDN) associated with the user's wireless device. When this information is submitted, it may be confirmed by a variety of mechanisms. For example, a confirmation email may be sent to the provided email address containing an embedded secure link or uniform resource locator (URL) address. When the user clicks on this link, a web page may be presented by the initial registration application confirming the user's registration with the Identity Register. After the user's initial registration is confirmed, the user's Identity Data is stored in the Identity Register for use with a multiplicity of applications that may support the Personal Identity Value required for identity authentication related to transactions, computer applications, networks, systems or devices.

One preferred embodiment of indirect registration occurs when an event external to the Identity Register occurs and the Event Data as well as Identity Data is sent to the Identity Register. If no data or record within the Identity Register exists, a new record is created automatically based on the Wireless Device ID associated with the Event Data or Identity Data. The record may contain any and all data received and based on the external event. The received Identity Data is stored in the Identity Register for use with a multiplicity of applications that may support the Personal Identity Value required for identity authentication related to transactions, computer applications, networks, systems or devices.

Once an entity's or individual's Wireless Device ID is registered in the Identity Register, external application events requiring identity authentication may be detected, received, processed, recorded and stored by the Identity Register. As these events are recorded and stored, the Identity Register may support authentication applications using both current Event Data as well as aggregate or historical Event Data stored for a particular Wireless Device ID. All data stored for a particular Wireless Device ID in the Identity Register, new received Event Data, additional received external Identity Data, as well as the existing Personal Identity Value may be used to generate a new or current Personal Identity Value. The new value may be used to assist in a determination of identity authentication for a current authentication event or future authentication events. The calculated Personal Identity Value may be continually maintained, updated and revised based on events to assist in determining an authentication result for a given secure activity requiring identity authentication of the user.

An identification authentication process may be performed by, for example, an external authentication application that resides on a computing platform or device that communicates with the Identity Register system. The Identity Register system is comprised primarily of an Event Processing Module, a Wireless Device Location Module, a Wireless Device ID Database, an Identity Database and one or more Identity Risk Logic Resources.

An Event Processing Module enables communications, transmission and reception of data associated with the functions of the Identity Register and supports the basic communications with external applications to receive Identity Authentication Events and related data.

A Wireless Device Location Module enables communications with a Wireless Network to obtain the position or location of an entity's or individual's wireless device.

A Wireless Device Identity (ID) Database enables the association of a unique wireless device identifier with the calculated personal identity value, the wireless device location, a multiplicity of identity authentication applications, Identity Authentication Events and event locations and times associated with identity authentication applications.

An optional Identity Database enables the storage and use of additional Identity Data that may be obtained via an external system or application associated with the Identity Register. The Identity Database enables the association of a Wireless Device ID and one or more additional identity information elements associated with a unique Wireless Device ID such as an entity's or individual's home address, work address, related locations or addresses frequented by the individual, various telephone numbers associated with an individual and additional Wireless Device IDs related to the present Wireless Device ID. Additional Wireless Device IDs associated with, or otherwise related to, the present Wireless Device ID may be required, such as those that may be associated with family members that may be associated with the same identity authentication application.

The Identity Risk Logic Resources comprise one or more computer logic resources to calculate a Personal Identity Value based upon data obtained via the Event Processing Module, the Wireless Device ID Database, the Identity Database and Identity Risk Configuration data. Furthermore, Identity Risk Configuration data are used to configure or otherwise provide dynamic or static parameter values used by one or more Identity Risk Logic Resources.

Based upon current data regarding an identification authentication event, which may include the Wireless Device ID, Event Data, such as type of event, location of the event, time of the event and the particular application the event pertains to, as well as currently obtained or stored identity data associated with the Wireless Device ID, a Personal Identity Value is calculated representing the probability of risk that identity theft has occurred or may be occurring.

The Personal Identity Value is calculated using one or more appropriate Identity Risk Logic Resources that use the data pertaining to the current Identity Authentication Event and application. The logic resources consider a multiplicity of factors based on the received identity authentication Event Data as well as received or currently stored Identity Data. These logic resource factors comprise calculations pertaining to the current and known locations derived from the data including distances among the received and known locations as well as time variances among the received and known locations, i.e. when the individual was at the locations.

There are a multiplicity of location types about the entity or individual factored into the Identity Risk Logic Resources. "Transient" locations are considered to be those locations where the individual is at for potentially only brief periods of time, such as the locations derived from a Wireless Network based on the Wireless Device ID while an individual is mobile. Other transient locations may include locations where financial transactions occur, such as automatic teller machines or point-of-sale locations where an automated purchase is made using, for example, a credit card or debit card. Still other transient locations may include an automatic detection of the presence of an individual's wireless device at a particular location, such as passing through an airport metal detector, entering a secure building using wireless radio frequency identification (RFID) based on proximity cards or similar devices or entering a secure or alarmed home or office where a manual keypad is used by the individual to enter a personal identification number (PIN) to gain entry.

Other location types may be categorized as "semi-permanent" meaning that the locations may be somewhat transient, yet the individual spends more than brief periods of time there. Examples of semi-permanent locations may be work addresses where an individual may spend extended periods of time, but not most of the day, or vacation home addresses where an individual may spend extended periods of time at irregular time intervals, such as different seasons, months or weeks.

Still other location types may be categorized as "permanent" meaning that the locations where an individual frequents are somewhat static, such as the individual's home address. It may be assumed in the case of permanent locations that the individual spends more time at those locations than semi-permanent or transient locations.

Other location data may be derived from other Identity Data pertaining to the entity or individual, such as telephone numbers. Telephone numbers are geographically-based so they imply a form of location data. All dialable telephone numbers, wireline or wireless, are of the aforementioned form of the mobile directory number (MDN). They can be up to 15 digits long and are unique numbers worldwide among all telephones, regardless of country or telecommunications network operator. The format of the telephone number has been standardized as the E.164 International Public Telecommunication Number by the International Telecommunications Union, a standards making organization within the United Nations. All telephone number addresses are comprised of two distinct parts or sections: a Country Code (CC) and a National Significant Number (NSN). The NSN may be comprised of two portions: a National Destination Code (NDC) and a Subscriber Number (SN). If the telephone number is a wireline number, the values for CC, NSN or NDC may be representative of the physical geography of where the landline central office telephone switch serving that line number resides. If the telephone number is a wireless number or mobile directory number (MDN), the values for CC, NSN or NDC may be representative of the physical geography of where the mobile subscriber's home mobile switching center (MSC) resides. Using a multiplicity of telephone numbers associated with an entity or individual, such as one or more home telephone numbers, work telephone numbers and mobile telephone numbers, transient, semi-permanent and permanent location types may be derived and used by the present invention.

One or more Identity Risk Logic Resources may consider one or more of these location types along with the distance variances among them. Also, if the dates and times are known when individuals are at these locations, the time variances among the multiple locations where an entity or individual has been may be factored into the logic resources.

The transient Identity Authentication Event, location and time parameters derived from currently received or stored location data may be stored in the Wireless Device ID Database. The semi-permanent and permanent location parameters may be stored in the Identity Database. These parameters may be given a particular and relative "weighting factor" to distinguish their relative importance for use in the Identity Risk Logic Resources.

These weighting factors may be stored for use by the Identity Risk Logic Resources in an Identity Risk Configuration file. This configuration file may be dynamically modified for use with a multiplicity of applications requiring identity authentication. The relative weighting factors may be given values that represent the importance of the parameters for use by the logic resources. As an illustrative example, a transient wireless device location associated with a Wireless Device ID currently obtained from a Wireless Network may have a larger relative value in a risk calculation than the individual's home address associated with the Wireless Device ID. If a particular application, such as a credit card cash advance financial transaction requires a Personal Identity Value to determine if the transaction is fraudulent or not, and the wireless device location is quite far from the individual's semi-permanent or permanent stored home and work addresses, a higher weighting factor for the transient wireless device location may result in a high Personal Identity Value implying a higher risk of identity theft that might be perpetrated upon the entity or individual. Furthermore, if the wireless device location of the entity or individual is determined to be quite far from the automated transaction location, the relative weighting factors of the locations may also result in a high Personal identity Value indicating a higher risk of identity theft. This Personal Identity Value may be returned to some external Results Processing System and stored in the Wireless Device ID Database and subsequently used by a multiplicity of identity authentication applications. If the Personal Identity Value is returned to a Results Processing System, an authentication application accessing the Results Processing System may use the Personal Identity Value to take some action or apply some treatment to the entity's or individual's automated activity or transaction.

Over time and for a variety of identity authentication applications, the entity's or individual's Personal Identity Value may be modified, revised or otherwise refined based on the types of authentication applications, types of application events, locations of the events, times of the events, location of the entity's or individual's wireless device and other known identity parameters stored within the Identity Register.

Data within the Identity Register to generate a Personal Identity Value may be created and stored dynamically based on the reception of Event Data or Identity Data associated with an identity authentication application. The creation of a new Wireless Device ID record within the Wireless Device ID Database may be dynamically created for an initial Identity Authentication Event for a particular identity authentication application. Furthermore, Identity Data may be provided to, or registered with, the Identity Register by individuals themselves who may wish to subscribe to some identity theft protection service.

As an illustrative example, individuals may access an Internet-based application displaying a web page containing a form that enables them to register their Wireless Device IDs and other Identity Data that may be used by a multiplicity of identity authentication applications. This exemplary Identity Register application may enable individuals to add, modify or delete their own Identity Data over time as that data changes enabling them to participate in their own identity theft protection.

A particular identity authentication application may reside within or be external to the Identity Register. The communication mechanism to receive Event Data and Identity Data may be via a data communications network or more directly if the identity authentication application resides within the same platform as the Identity Register.

Supported identity authentication applications are used to determine the authenticity of a user attempting to access or otherwise operate a computer application, network or device. These identity authentication applications may also represent the Results Processing System receiving the Personal Identity Value for a particular Identity Authentication Event.

Illustrative examples of Identity Authentication Events pertaining to identity authentication applications may include a wireless device user coming into proximity of an electronic or automated device associated with a secure computer application or network that may detect the wireless device via a wireless protocol such as Bluetooth, WiFi, RHD, near field communications (NFC), electro-magnetic or other communications protocol or mechanism. Other illustrative examples of Identity Authentication Events may include physical connectivity of an electronic or automated device such as a wireless device, biometric device, magnetic card, network connected computerized device or other connected communications protocol or mechanism to a secure computer application, network or device requiring authentication for access or to authenticate a secure activity or transaction. Physical connectivity enabling communication of Identity Authentication Events may be via a USB wired connection, serial port connection, electro-magnetic or other communications protocol or mechanism. Other illustrative examples may include invocation of some identity authentication application requiring an authentication process for access or operation such as some manual action taken by an individual accessing a computerized, electronic or automated device, including pressing a "hard" or "soft" button on a computerized system or device, accessing a biometric device or employing some mechanical action. Still other illustrative examples may include some automatic invocation of an authentication process with no manual user interaction by a computerized, electronic or automated device, including a wireless device, biometric device, electronic message or telecommunications call.

Illustrative examples of the types of activities and transactions that the present invention may provide identity theft protection and utility include financial transactions such as credit card transactions, debit card transactions, electronic fund transfers, deposit transactions and non-financial bank transactions such as change of account data transactions. Other examples include online account activations, online purchases, online banking transactions, online gaming access, online sharing of data, online interactive messaging systems (e.g. sending and receipt of email, instant messages, etc.) online social networking, online communications systems, software-based automated systems and services, hardware-based automated systems and services, computer access (e.g. log-ons, log-offs, etc.), website registrations, activations, deactivations, computer applications, network or device registrations, activations, deactivations and any applications requiring identity authentication.

In one embodiment of the present invention, an Identity Register is provided. The Identity Register enables the location of a wireless device obtained from a Wireless Network to be used in conjunction with Identity Data and Event Data emanating from an Identity Authentication Event associated with an application requiring identity authentication to generate a Personal Identity Value representing the likelihood that identity theft has occurred.

In one embodiment, an Event Processing Module of the present invention receives current Event Data, an entity's or individual's Identity Data and an entity's or individual's wireless device location data in a multiplicity of formats. In this embodiment, the Event Processing Module passes the Event Data to the Wireless Device ID Database. Similarly, the Event Processing Module passes the Identity Data to the Identity Database. A Wireless Device Location Module obtains the location of the wireless device associated with the Event Data and Identity Data and identified by a unique Wireless Device ID. The Wireless Device Location Module passes, directly or indirectly, the wireless device location to the Wireless Device ID Database for storage. The Event Data, Identity Data and wireless device location data are passed to one or more Identity Risk Logic Resources. This logic results in the generation of a Personal Identity Value. The Identity Risk Logic Resources obtain data from an Identity Risk Configuration file that provides information pertaining to how the Event Data and Identity Data for a particular identity authentication application are to be calculated. The resulting and generated Personal Identity Value can then be passed to a Results Processing System associated with the identity authentication application. The identity authentication application may then take some action based on the generated and received Personal Identity Value. The Personal Identity Value is stored in the Wireless Device ID Database for subsequent use by other identity authentication applications as well as to be used in subsequent identity risk logic calculations. The Personal Identity Value may be provided in a multiplicity of formats and used to authenticate, verify or validate an entity's or individual's identity associated with an automated activity or transaction engaged in by the entity or individual.

In an exemplary operation of the Identity Register, an Identity Authentication Event is generated from some automated or manual activity engaged in by an entity or individual. In one embodiment, an entity's or individual's wireless device is active, powered on and communicates with a Wireless Network, local wireless communications link or local wired communications link. The wireless device is in dose proximity to a computer application network, system or device. Depending on the particular application, network, system or device, dose proximity can be anywhere from several miles to several feet.

When the individual comes into some proximity (as previously defined) of a computer application, network or device, or otherwise attempts to invoke a computer application, network or device, either himself or via some external communications mechanism, that requires identity authentication for access and operation, an authentication application passes information about that event as Event Data to the Event Processing Module of the Identity Register. The Event Data may contain, in a multiplicity of formats, various information such as the unique Wireless Device ID of an entity, individual or data subject associated with the event, the type of event, the particular authentication application the event pertains to, the location where the event occurs and the date and time of the event. Non-limiting examples of the types of events that may occur are registration events where an entity or individual is either directly or indirectly registering with the Identity Register platform. A direct registration event may occur, for example, via an application that supports or otherwise enables registration of data directly by an individual into the Identity Register. An indirect registration event may be, for example, via an application that supports or otherwise enables registration of data indirectly, or on behalf of, an entity or individual into the Identity Register. A registration event may include the Wireless Device ID of the entity or individual in the form of a unique mobile directory number (MDN) or other type or format of unique identifier. When a registration event occurs, the unique wireless identifier representing the entity's or individual's identity is included in the event. Examples of other events are authentication events where an identity authentication process is requested to be performed within the Identity Register. For authentication events, if an entity or individual is not previously registered within the Identity Register, they may be indirectly registered as a function of the authentication event. When an authentication event occurs, the unique Wireless Device ID representing the entity's or individual's identity is included in the event. This Wireless Device ID may be used to register the entity or individual within the Identity Register. An authentication event, for example, may be an event that represents a request for the Identity Register to generate a Personal Identity Value for the entity or individual represented by the unique Wireless Device ID, or other identifier. Other events may include requests for one or more Personal Identity Values stored within the Identity Register that may or may not be associated with a particular authentication event.

Non-limiting examples of authentication applications that may produce authentication events represented by Event Data include financial transactions such as automated fund withdrawal transactions using an automatic teller machine or point-of-sale terminal, fund transfer transactions, deposit transactions and non-monetary transactions such as changes to financial account information. For these transactions, the unique Wireless Device ID along with an application identifier may be sent as Event Data to the Identity Register in order to perform an identity authentication process for the individual associated with the unique Wireless Device ID. Other examples of authentication applications that may produce authentication events may be applications that enable access to online websites, applications that enable access to computer hardware systems, applications that enable entry into homes or buildings such as an individual entering a digital code into a keypad or applications where a wireless device may come into proximity of another hardware device that supports RFID or NFC communications or other wireless communications protocol.

Non-limiting examples of the location information of where an event occurs that may be associated and included with Event Data include a multiplicity of information element formats that represent geographic location data such as a physical geographic address (e.g. street number, street name, city, state, province, country, postal code, ZIP code, etc.), a physical data communications address (e.g. an Internet Protocol geographic address of the form XX.XX.XX.XX), a logical or virtual place or data communications address (e.g. a post office box or a uniform resource locator or URL address), some representation of an address (e.g. an alias name or label identifying an address), a geographic place name (e.g. "Central Park"), mapping coordinates (e.g. latitude and longitude or other projection coordinates) or a mapping identifier in some customized format.

The date and time that an Identity Authentication Event occurs may also be included in the Event Data to be passed to the Identity Register. The date and time may be generated external to the Identity Register and associated with an application external to the Identity Register and passed as Event Data. The date and time may be generated by the Identity Register itself when Event Data is received by the Event Processing Module. Event Data passed to the Identity Register may be subsequently used to generate Personal Identity Values for entities, individuals or data subjects associated with the Event Data.

In an exemplary operation of the Identity Register, Identity Data pertaining to an entity or individual may be sent to the Identity Register. This Identity Data may include, in a multiplicity of formats, various information related to the identity of the entity or individual, or data subject, either previously registered within or to be registered within the Identity Register. The Identity Data may contain in a multiplicity of formats various information such as the unique Wireless Device ID of an entity or individual or data subject associated with the Identity Data. Non-limiting examples of Identity Data may include both location-based data as well as other data. Location-based data may include the individual's Wireless Device ID (e.g. MDN), home address, work address, other addresses frequented by the individual, home telephone number, work telephone number, other telephone numbers used, or any other location related data. Data that may be included that is not location-based may include the individual's gender, birth date, mother's maiden name or other identity data associated with the individual.

Identity Data may be sent to the Identity Register either directly or indirectly when an entity or individual is registering with the Identity Register or during an Identity Authentication Event. The Identity Data may be included as a portion of the Event Data sent to the Identity Register or may be sent separately to the Identity Register via an identity registration application external to the Identity Register or otherwise provided by, supported by or enabled by the Identity Register. Identity Data passed to the Identity Register may be subsequently used to generate Personal Identity Values for entities, individuals or data subjects associated with the Identity Data.

Once Event Data, and optionally Identity Data, are received by the exemplary Event Processing Module within the Identity Register pertaining to an entity, individual or data subject and associated with an Identity Authentication Event, the Event Data is passed to the Wireless Device ID Database for storage. Identity Data is passed to the Identity Database for storage. Based on the type of event, a Personal Identity Value may be generated within the Identity Register. When a Personal Identity Value is required to be generated, the Event Processing Module passes the unique Wireless Device ID associated with the Event Data to the exemplary Wireless Device Location Module.

The unique Wireless Device ID is typically the dialable Mobile Directory Number (MDN) of the user's wireless device, but may assume other values as appropriate, such as an Electronic Serial Number (ESN) of the device, an International Mobile Subscriber Identity (IMSI) or an International Mobile Equipment Identity (IMEI). Use of the MDN is typical due to global uniqueness among wireless device users and its common use in wireless industry network communications protocols. The MDN of the wireless device may be used to query the Wireless Network via the Wireless Device Location Module for current or last known location information of the wireless device, or location information pertaining to the wireless device may be obtained autonomously by the Wireless Device Location Module from the Wireless Network. Location information may be requested by these modules or the location information may be obtained autonomously.

Once the wireless device location is obtained by the Identity Register, this location information is passed along with the associated and corresponding Wireless Device ID to the Wireless Device ID Database within the Identity Register to resolve the location information into an appropriate format for adequate use by the Identity Risk Logic Resources. The exemplary Wireless Device ID Database is employed, to resolve the obtained location information into appropriate geographic mapping information to be used for a particular identity risk logic calculation. The resulting geographic location value derived from the database and associated with the unique Wireless Device ID previously obtained are sent to the Identity Risk Logic Resources.

Similarly, once the event location is obtained by the Identity Register, this location information is passed along with the associated and corresponding Wireless Device ID to the Wireless Device ID Database within the Identity Register to resolve the location information into an appropriate format for adequate use by the Identity Risk Logic Resources. The exemplary Wireless Device ID Database is employed, to resolve the obtained location information into appropriate geographic mapping information to be used for a particular identity risk logic calculation. The resulting geographic location value derived from the database and associated with the unique Wireless Device ID previously obtained are sent to the Identity Risk Logic Resources.

Once Event Data is obtained for an Identity Authentication Event emanating from an identity authentication application, the Event Data may invoke the Identity Register to generate a Personal Identity Value. A Personal Identity Value pertaining to an entity, individual or data subject and associated with an Identity Authentication Event is generated by one or more Identity Risk Logic Resources using data obtained from the Event Data, optional Identity Data, data obtained from the exemplary Wireless Device ID Database, data obtained from the exemplary Identity Database, and data from the exemplary Identity Risk Configuration. The Identity Risk Logic Resources use a variety of data from these sources in a multiplicity of formats and applies the information provided by the Identity Risk Configuration in order to proceed with the appropriate identity risk logic calculation to produce the particular Personal Identity Value.

The Identity Risk Logic Resources use location data obtained about the authentication event for an authentication application engaged in by the entity or individual, the entity's or individual's wireless device location data, location data associated with the Wireless Device ID stored in the exemplary Identity Database, one or more previously calculated Personal Identity Values stored in the exemplary Wireless Device ID Database and weighting factors designating the importance of each of the information elements that may be defined in the Identity Risk Configuration data to generate a current Personal Identity Value for the entity, individual or data subject. The Identity Risk Logic Resources may generate a multiplicity of distance and time variables from the data for the Personal Identity Value calculation such as the distance between the entity's or individual's wireless device location and the individual's home location, the distance between the individual's wireless device location and the individual's work location, the distance between the individual's home location and the individual's work location, the distance between the individual's wireless device location and the Identity Authentication Event location, the distance between the entity's or individual's home location and the Identity Authentication Event location, the distance between the individual's work location and the Identity Authentication Event location, the distance between other frequented locations stored in the Identity Database and the Identity Authentication Event location, the distance between other frequented locations stored in the Identity Database and the individual's wireless device location, etc. Similarly, the time variance between the last known wireless device location and the Identity Authentication Event location as well as other time variances among the data parameters may be used in the identity risk logic calculation.

Once a Personal Identity Value representing the likelihood that identity theft has occurred, or is occurring, for the particular Identity Authentication Event, it may be passed in an appropriate format to a Results Processing System. The Results Processing system may be external to the Identity Register or internal to the Identity Register. The Results Processing System may reside within, or be the same as, the aforementioned authentication application or some other system that requires the Personal Identity Value results. An exemplary Results Processing System may apply the Personal Identity Value to any type of application regardless of the value of the result or the type of application. These applications may include identity authentication systems, activity fraud management systems, financial fraud detection systems, online website applications or any secure system where identity authentication is required.

Note that an embodiment of the present invention is not limited to wireless devices used as mobile telephones and identified by an MDN. The present invention may apply for use with any wireless device distinguished by a unique identifier.

In FIG. 1, one embodiment of an Identity Register 100 of the present invention includes an Event Processing Module 120, a Wireless Device Location Module 110, a Wireless Device ID Database 140, an optional Identity Database 180, Identity Risk Logic Resources 130, and an Identity Risk Configuration 150, in accordance with the principles of the present invention. The Event Processing Module 120 obtains Event Data 310 emanating from some Identity Authentication Event 330 associated with some identity authentication application. The Event Processing Module 120 also obtains Identity Data 320 associated with an entity, individual or data subject as part of a registration process or associated with Event Data 310. The Event Processing Module 120 passes the Event Data 310 to the Wireless Device ID Database 140 for storage and use for the generation of a Personal Identity Value based upon the provided Wireless Device ID included with the Event Data 310. The Event Processing Module 120 passes the Identity Data 320 to the optional Identity Database 180 for storage and use for the generation of a Personal Identity Value based upon the provided Wireless Device ID included with the Identity Data 320. The Event Processing Module 120 passes the entity's or individual's unique Wireless Device ID associated with both the Event Data 310 and the Identity Data 320 to the Wireless Device Location Module 110 that is used to obtain the location of a Wireless Device 210, such as a mobile telephone, from a Wireless Network 200. The Wireless Device Location Module 110 may also obtain wireless device location information from any type of Wireless Computing Device or appliance 220 for which an identity authentication application may apply. The Wireless Device Location Module 110 passes the obtained wireless device location associated with the Wireless Device ID to the Wireless Device ID Database 140 directly or indirectly via the Event Processing Module 120. The Event Processing Module 120, the Wireless Device ID Database 140 and the optional Identity Database 180 provide the appropriate data and parameters associated with the Wireless Device ID to the Identity Risk Logic Resources 130 to generate a Personal Identity Value. The data may be provided directly to one or more Identity Risk Logic Resources 130 by the respective databases, 140 and 180, or via the Event Processing Module 110. One or more Identity Risk Logic Resources 130 may use configuration data supplied by the Identity Risk Configuration 150 to properly calculate and generate a Personal Identity Value. Once the Personal Identity Value is calculated, it is sent to a Results Processing System 300 directly or indirectly via the Event Processing Module 120. The Results Processing System 300 may then apply Personal Identity Value to some identity authentication application associated with an Identity Authentication Event 330 engaged in by an entity, individual or data subject associated with a Wireless Device 210 or other Wireless Computing Device 220.

Figure 2:
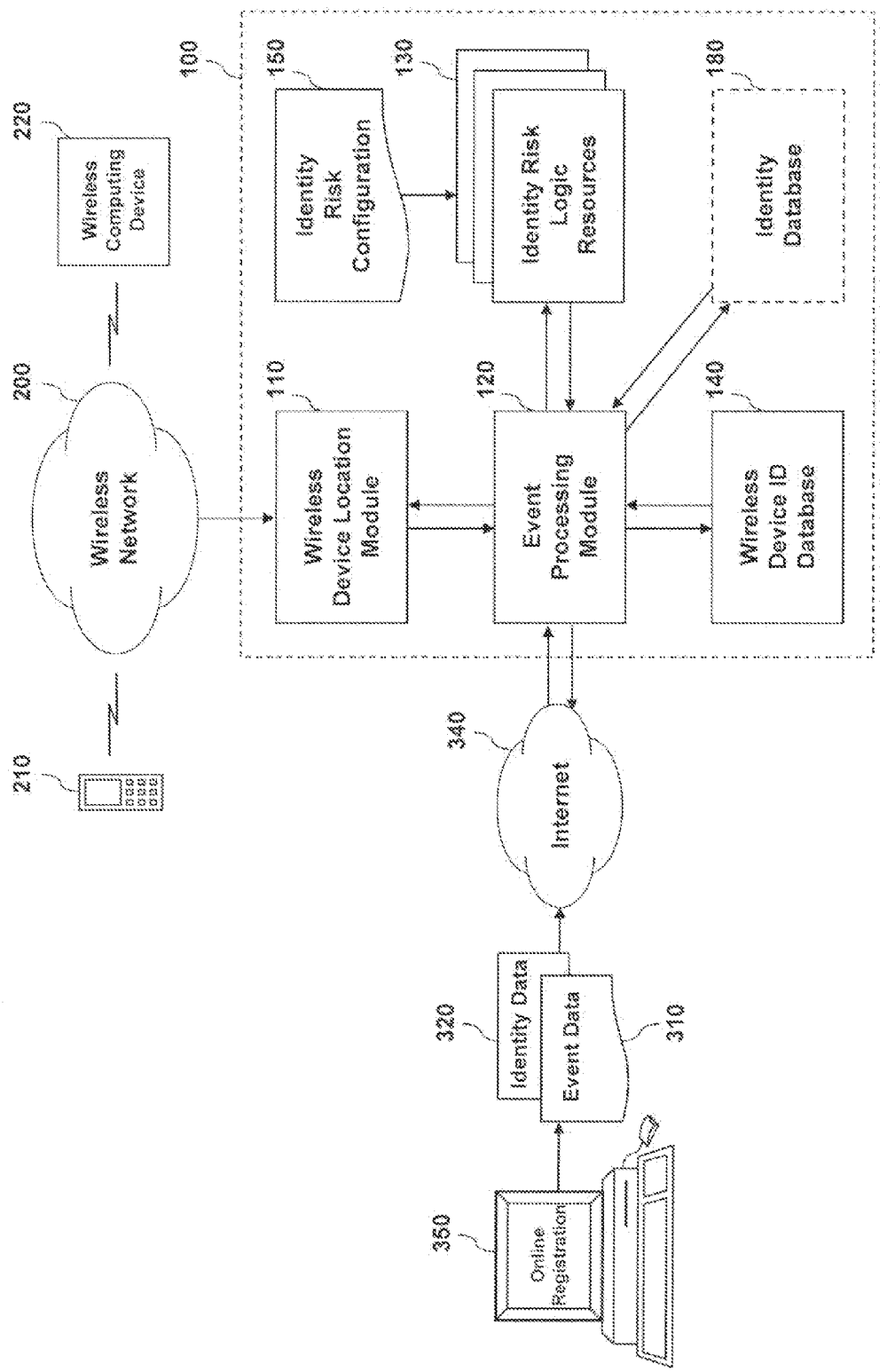
FIG. 2 depicts the functional entities and modules of an exemplary Identity Register used by an entity or individual to register and otherwise maintain Identity Data stored in the Identity Register.

FIG. 2 depicts the use of one embodiment of an Identity Register 100 by an exemplary Online Registration application 350. One embodiment of an Online Registration application 350 may be an Internet-based web application accessed via a computer that enables an individual to enter Identity Data 320 into a web-based form and send Identity Data 320 and registration Event Data 310 to the Identity Register 100 via the Internet 340. The Event Processing Module 120 obtains the entity's or individual's registration Event Data 310 as well as the Identity Data 320 emanating from the Online Registration application 350 supplied by an entity or individual and based upon the Wireless Device ID provided with the Identity Data 320. The Event Processing Module 120 passes the registration Event Data 310 to the Wireless Device ID Database 140 for storage and use for the generation of a Personal Identity Value. The Event Processing Module 120 passes the Identity Data 320 to the optional Identity Database 180 for storage and use for the generation of a Personal Identity Value.

FIG. 3 depicts exemplary entries in an exemplary Wireless Device ID Database 140 shown in FIGS. 1 and 2. In particular, as depicted in FIG. 3, a first entry 148 includes an association among a Wireless Device ID 141 (e.g. in this case an MDN), the Wireless Location 142, the Wireless Geographic Place 143 associated with the Wireless Location 142, the Wireless Location Date and Time 144 associated with the Wireless Location 142, the Application ID 145 representing the relevant identity authentication application, the Personal Identity Value 146 and Historical Personal Identity Values 147. The Wireless Device ID is used by the Wireless Device Location Module 110 in FIGS. 1 and 2 to either request the Wireless Location 142 from the Wireless Network 200 in FIG. 1 or autonomously receive the Wireless Location 142 from the Wireless Network 200. The obtained Wireless Location 142 is then associated with a Wireless Geographic Place 143 as well as the Wireless Location Date and Time 144 in the database. The entries for Wireless Geographic Place 143 in the database may be pre-populated and resolved for the obtained Wireless Location 142 or otherwise derived based upon known mapping information within the database. Examples of the Wireless Location 142 value obtained via the Wireless Device Location Module 110 in FIGS. 1 and 2 may be Mobile Switching Center (MSC) ID, Cell Site ID, latitude or longitude coordinates or any other projection coordinates that may be associated with a Wireless Geographic Place 143. Examples of the Wireless Geographic Place 143 entries in the database are a Geographic Name, some Geographic Identifier (ID) value that facilitates one or more subsequent Identity Risk Logic Resources 130 in FIGS. 1 and 2 or Coordinates that may take on the form of latitude and longitude or any other projection coordinates that may facilitate one or more subsequent Identity Risk Logic Resources 130 in FIGS. 1 and 2. Examples of the Wireless Location Date and Time 144 entries in the database are also provided. The Wireless Location Date and Time 144 entries may, for example, represent a previously known date and time of a particular obtained wireless device location to assist in determining, for example, a Personal Identity Value 146.

The Application ID 145 contains entries in the database that associate a particular Application (e.g. Application 1, Application 2, etc.) received along with Event Data 310 in FIGS. 1 and 2, the Event type associated with the Event Data 310 in FIGS. 1 and 2, the Location associated with the Event Data 310 in FIGS. 1 and 2 and the Date and Time associated with the Event Data 310 in FIGS. 1 and 2. The Personal Identity Value 146 for the associated Wireless Device ID 141 has been generated due to some previous Identity Authentication Event 330 in FIGS. 1 and 2 and based upon some previously received Event Data 310 in FIGS. 1 and 2 or Identity Data 320 in FIGS. 1 and 2. Both the Personal Identity Value 146 and Historical Personal Identity Values 147 may be used in one or more Identity Risk Logic Resources 130 in FIGS. 1 and 2 to generate subsequent Personal Identity Values that may be stored in the exemplary Wireless Device ID Database 140.

FIG. 4 depicts exemplary entries in an exemplary Identity Database 180 shown in FIGS. 1 and 2. In particular, as depicted in FIG. 4, a first entry 188 includes an association among a Wireless Device ID 181 (e.g. in this case an MDN), the individual's Home Address 182, the individual's Work Address 183, one of the individual's phone numbers, Phone 1 184, a second of the individual's phone numbers, Phone 2 185, other or additional Related Locations 186 and Related Wireless Device ID Entries 187. The Wireless Device ID is used by the exemplary Wireless Device ID Database 140 in FIGS. 1 and 2 and FIG. 3, and the Wireless Device Location Module 110 in FIGS. 1 and 2. The Wireless Device ID may be used as the primary parameter used to associate data from the Wireless Device ID Database 140 in FIGS. 1 and 2 and FIG. 3, the present Identity Database 180 in FIGS. 1 and 2, Event Data 310 in FIGS. 1 and 2 and Identity Data 320 in FIGS. 1 and 2 to provide aggregate data and appropriate parameters to be used in one or more Identity Risk Logic Resources 130 in FIGS. 1 and 2. The entries for the individual's Home Address 182, the individual's Work Address 183, one of the individual's phone numbers, Phone 1 184, a second of the individual's phone numbers, Phone 2 185, other or additional Related Locations 186 and Related Wireless Device ID Entries 187 may be provided directly by an individual via an Online Registration application 350 in FIG. 2 or indirectly as provided along with Event Data 310 in FIGS. 1 and 2. The Home Address 182 represents the home address of the individual and may contain detailed address data including House Number, Apartment Number, Street Name, City, State, County, District, Postal Code, Country or other relevant address data. The Work Address 183 represents the place of work of the individual and may contain detailed address data including Building Number, Suite Number, Street Name, City, State, Postal Code, Country or other relevant address data, Phone 1 184 and Phone 2 185 represent additional telephone numbers that the individual may use that may be associated with the individual's identity. These telephone numbers are geographically based and are of the format CC for Country Code plus NDC for National Destination Code plus SN for Subscriber Number. These telephone numbers may be other Mobile Directory Numbers (MDNs) or wireline telephone numbers used for home or work. Other Related Locations 186 represent other locations associated with an individual that may take on address values similar to Home Address 182 and Work Address 183 as well as telephone numbers similar to Phone 1 184 and Phone 2 185. These other locations may represent, for example, favorite locations frequented by the individual such as relatives' or friends' homes or other places commonly visited. Related Wireless Device ID Entries 187 may be provided that may be used to associate a record in the present exemplary Identity Database 180 with another record in the present exemplary Identity Database 180 identified by a Wireless Device ID 181 or to associate multiple records identified by a Wireless Device ID 141 in the exemplary Wireless Device ID Database 140 in FIGS. 1 and 2 and FIG. 3. This association may be required when, for example, multiple Wireless Device IDs or MDNs are associated among family members that may reside within the same household or otherwise share applications or accounts associated by the same Application ID 145 within an exemplary Wireless Device ID Database 140 in FIGS. 1 and 2 and FIG. 3. The data stored in the exemplary Identity Database 180 may be used along with the data stored in the exemplary Wireless Device ID Database 140 in FIGS. 1 and 2 and FIG. 3 as parameters used by one or more Identity Risk Logic Resources 130 in FIGS. 1 and 2.

FIG. 5 depicts exemplary entries in an exemplary Identity Risk Configuration file 150 shown in FIGS. 1 and 2, This exemplary Identity Risk Configuration file is used to provide information and data to one or more Identity Risk Logic Resources 130 in FIGS. 1 and 2 that indicate the particular data parameters and factors for the data parameters used by the Identity Risk Logic Resources 130 in FIGS. 1 and 2. In particular, as depicted in FIG. 5, a first entry 154 includes an Application ID 151, Identity Data 152 and the particular Identity Risk Logic Resource 153 associated with the particular Application ID 151 and Identity Data 152. The Application ID 151 represents the same Application ID within the Wireless Device ID Database 145 in FIG. 3 and is comprised of particular Events (e.g. Event 1, Event n, etc.) and Weighting Factors for those Events associated with a particular Application (e.g. Application 1, Application 2, etc). These Events (e.g. Event 1, Event n, etc.) are events associated with Event Data 310 in FIGS. 1 and 2 associated with an Identity Authentication Event 330 in FIGS. 1 and 2, associated with some identity authentication application. The Weighting Factors are used to provide a relative value of the importance of the particular Event (e.g. Event 1, Event n, etc.) for the particular Application (e.g. Application 1, Application 2, etc.) used by one or more Identity Risk Logic Resources 130 in FIGS. 1 and 2. The values of these Weighting Factors may be changed automatically based upon the distance and time variances among any of the location and time parameters used enabling the Identity Risk Logic Resources 130 in FIGS. 1 and 2 to provide accurate Personal Identity Values indicating a likelihood of identity theft for the particular application represented by the Application ID 151 and Application ID 145 in FIG. 3. The Identity Data 152 is comprised of particular Locations (e.g. Home, Work, Phone 1, Phone 2, Location 1, Location n, etc.) and Weighting Factors for those Locations associated with a particular Application (e.g. Application 1, Application 2, etc.) and the provided Identity Data within the exemplary Identity Database 180. The Weighting Factors are used to provide a relative value of the importance of the particular Location for the particular Application (e.g. Application 1, Application 2, etc.) used by one or more Identity Risk Logic Resources 130 in FIGS. 1 and 2. The values of these Weighting Factors may be changed automatically based upon the distance and time variances among any of the location and time parameters used enabling the Identity Risk Logic Resources 130 in FIGS. 1 and 2 to provide accurate Personal Identity Values indicating a likelihood of identity theft for the particular application represented by the Application ID 151 and Application ID 145 in FIG. 3.

FIG. 6 is an exemplary detailed information and system flow diagram representing the operation of an Identity Register, in accordance with one embodiment of the present invention. In this exemplary information and system flow, an entity or individual may initially invoke manually or automatically some transaction or application-based activity associated with an identity authentication application resulting in an Identity Authentication Event 330 in FIGS. 1 and 2.

Step 400: An Identity Authentication Event occurs and a Wireless Device ID and associated Event Data is sent to the Event Processing Module of the Identity Register. The Wireless Device ID and associated Event Data may be sent autonomously or requested based on some other interaction between the Identity Register and the identity authentication application.

Step 402: Identity Risk Logic Parameters are either requested from the Identity Risk Configuration or sent to the appropriate Identity Risk Logic Resource. This step may occur at any time and is not necessarily dependent on any actions occurring external to the Identity Register.

Step 404: The Event Processing Module passes the Wireless Device ID and associated Event Data to the Wireless Device ID Database for storage and subsequent use by the appropriate Identity Risk Logic Resource associated with the particular identity authentication application.

Step 406: The Wireless Device Location Module passes the Wireless Device ID along with the associated Wireless Location and Time either directly to the Wireless Device ID Database or indirectly via the Event Processing Module. The Wireless Location may have been initially requested by the Wireless Device Location Module via the Event Processing Module or autonomously sent to the Wireless Device Location Module.

Step 408: If the Wireless Location and Time associated with the Wireless Device ID is passed to the Event Processing Module, it is then passed to the Wireless Device ID Database.

Step 410: The appropriate data and parameters stored within the Wireless Device ID Database and required by the Identity Risk Logic Resources are passed either directly to the Identity Risk Logic Resources or indirectly to the Identity Risk Logic Resources via the Event Processing Module.

Step 412: The appropriate data and parameters stored within the Identity Database and required by the Identity Risk Logic Resources are passed either directly to the Identity Risk Logic Resources or indirectly to the Identity Risk Logic Resources via the Event Processing Module.

Step 414: If the appropriate data and parameters have been passed to the Event Processing Module from the Wireless Device ID Database or the Identity Database, they are subsequently passed to the appropriate Identity Risk Logic Resource to be used in a calculation to generate a Personal Identity Value for the particular Event and identity authentication application.

Step 416: A Personal Identity Value is generated and passed either directly to the Wireless Device ID Database or indirectly to the Wireless Device ID Database via the Event Processing Module.

Step 418: If the Personal Identity Value is passed to the Event Processing Module, it is then passed to the Wireless Device ID Database for storage and to be used by one or more identity authentication applications.

Step 420: The Personal Identity Value is passed to a Results Processing System that may be associated with an identity authentication application to effect some utility in the concerned automated application, activity or transaction engaged in by the entity or individual identified by the Wireless Device ID.

Step 422: An Identity Authentication Event occurs and a Wireless Device ID and associated Identity Data is sent to the Event Processing Module of the Identity Register. The Wireless Device ID and associated Identity Data may be sent autonomously or requested based on some other interaction between the Identity Register and the identity authentication application. This step may be specific to an online registration event by an entity or individual registering with the Identity Register and may occur at any time separate and distinct from Steps 400 through 420.

Step 424: Identity Parameters associated with the Wireless Device ID and associated with an online registration event by an individual registering with the Identity Register are sent to the Identity Database for storage and subsequent use in generating a Personal Identity Value.

Figure 7:
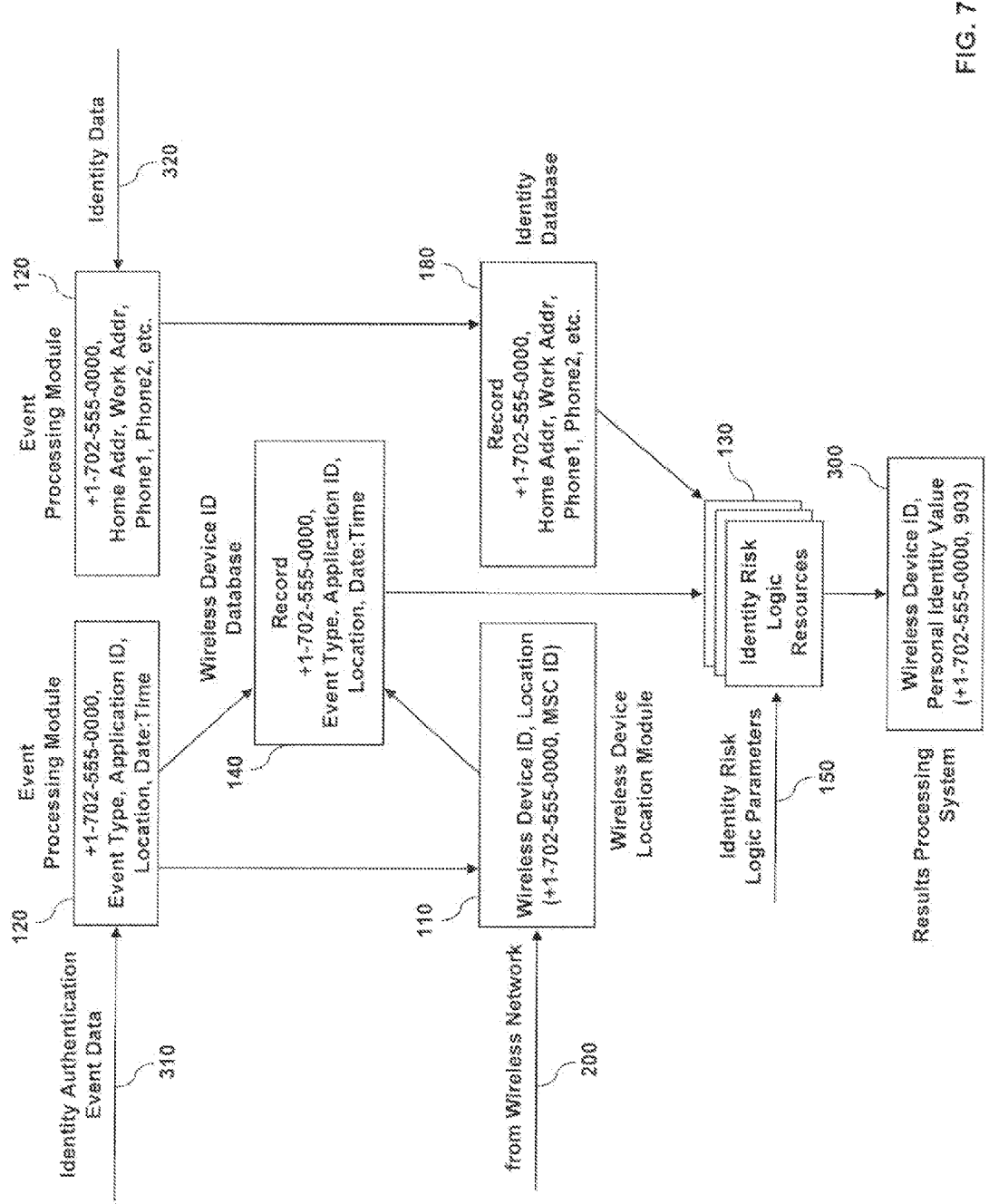
FIG. 7 depicts an exemplary process flow diagram of the Identity Register.

FIG. 7 is an exemplary detailed process flow diagram representing the operation of an Identity Register, in accordance with one embodiment of the present invention. In this exemplary process flow, an entity or individual may initially invoke some transaction or application-based activity resulting in an Identity Authentication Event 330 in FIGS. 1 and 2. In this exemplary process flow, the Identity Authentication Event Data 310 are provided to the Event Processing Module 120. The Event Data consists of a value of "+1-702-555-0000" as an exemplary Wireless Device ID and, more specifically, the MDN of an entity or individual whose identity requires authentication. The Event Data also consists of an Event Type, which may be an authentication event, an Application ID pertaining to the particular application requiring identity authentication for the entity or individual and the Location and Date and Time of the authentication event. Identity Data 320 are provided to the Event Processing Module 120. The Identity Data consists of a value of "+1-702-555-0000" as an exemplary Wireless Device ID and, more specifically, the MDN of an entity or individual whose identity requires authentication. The Identity Data also consists of the Home Address, Work Address, Phone 1 and Phone 2 and potentially other related location data.

The Event Processing Module 120 passes the Identity Authentication Event Data 310 to the Wireless Device ID Database 140. The Wireless Device ID Database 140 records and stores the Identity Event Authentication Data 310.

The Event Processing Module 120 passes the Identity Data 320 to the Identity Database 180. The Identity Database 180 records and stores the Identity Data 320.

In this exemplary process flow, the Wireless Device ID and Wireless Location are provided to the Wireless Device Location Module 110 by the Wireless Network 200. An exemplary value for the Wireless Device ID may be "+1-702-555-0000" which serves as the MDN of the entity or individual. An exemplary value for Wireless Location may be "MSC ID" which serves as a physical and geographically-based area that may be currently serving the Wireless Device represented by the MDN. The Wireless Device ID and associated Wireless Location are passed from the Wireless Device Location Module 110 to the Wireless Device ID Database 140.

The Wireless Device ID Database 140 and the Identity Database 180 pass all relevant data parameters associated with the Wireless Device ID represented by the exemplary value "+1-702-555-0000" to one or more Identity Risk Logic Resources 130.

Identity Risk Logic Parameters 150 are passed to the Identity Risk Logic Resources 130 for use in generating a Personal Identity Value for the entity or individual represented by the exemplary value "+1-702-555-0000" and the appropriate Application ID from the Identity Authentication Event Data 310.

One or more Identity Risk Logic Resources 130 are used to calculate and generate a Personal Identity Value for the particular authentication application for the entity or individual represented by the unique Wireless Device ID represented by the exemplary value "+1-702-555-0000."

The generated Personal Identity Value represented by the exemplary value "903" and the unique Wireless Device ID represented by the exemplary value "+1-702-555-0000" for the entity or individual are sent from the Identity Risk Logic Resources 130 to a Results Processing System 300. The Results Processing System 300 may then apply the Personal Identity Value to, for example, an authentication, verification or validation application used to authenticate, validate or verify the entity's or individual's identity who is engaged in some automated secure activity or transaction.

FIG. 8 depicts an exemplary Online Registration application 350 shown in FIG. 2 enabling individuals to register Identity Data with the Identity Register 100 shown in FIGS. 1 and 2. The exemplary Online Registration application enables, for example, an individual to enter their primary Wireless Device ID (e.g. an MDN or mobile telephone number) into a web-based form for an Internet-based application to register for identity theft protection with the Identity Register 100 shown in FIGS. 1 and 2. Additional web pages may be used to enable an individual to enter additional Identity Data 180 in FIG. 4 into an Identity Database 180 in FIG. 2 in accordance with the present invention.

In accordance with the principles of the present invention, an Identity Register is provided. The Identity Register comprises modules that obtain wireless device location from a Wireless Network as well as Event Data associated with an identity authentication application and Identity Data pertaining to an entity or individual One or more Identity Risk Logic Resources are employed to generate Personal Identity Values for entities or individuals engaged in a secure and automated activity or transaction representing the likelihood that identity theft has occurred or is occurring. The secure activity or transaction may be a commercial point-of-sale transaction at a retail establishment, an online banking transaction from a personal computer, an e-commerce transaction from a personal computer, a computer-automated voting application, an automated alarm system or the invocation of any automated application where a likelihood of identity theft may occur. The Personal Identity Values may be provided in a multiplicity of formats and sent to a Results Processing System where they may be applied to a particular application.

The present invention provides multiple benefits. The use of an Identity Register and generated Personal Identity Values may significantly reduce incidents of financial identity theft and identity deception. The present invention provides identity authentication for any type of secure and automated activity or transaction and may reduce the incidence of false positive indications of fraudulent activity using only traditional fraud detection mechanisms in use today. Additionally, use of Personal Identity Values as described in the present invention adds utility to a multiplicity of computer applications, networks and devices requiring secure user access or authentication.

While the invention has been described with reference to the exemplary embodiments thereof, those skilled in the art will be able to make various modifications to the described embodiments of the invention without departing from the true spirit and scope of the invention.

What is claimed is:

1. A method of enabling authentication of one or more activities attempted between an entity and an electronic device, the method comprising the steps of:
   obtaining, from a data network, device data uniquely identifying a wireless device associated with the entity;
   obtaining, from a data network, location data identifying the location of the entity;
   accessing a data record characterizing at least one authenticated activity of the entity; and
   generating a value uniquely associated with the entity, the value configured to characterize to the electronic device the authenticity of the entity, wherein the value is based on the device data, location data and data record.

2. A apparatus for enabling authentication of one or more activities attempted between an entity and an electronic device, comprising:
   at least one application to obtain, from a data network, device data uniquely identifying a wireless device associated with the entity, obtain, from a data network, home location data identifying the home location of the entity, access a data record characterizing at least one authenticated activity of the entity, and generate a value uniquely associated with the entity, the value configured to characterize to the electronic device the authenticity of the entity, wherein the value is based on the device data, home location data and data record; and
   a database to store the data record.

3. An apparatus according to claim 2, wherein the at least one application is a software based application communicating with an identity register.

4. An apparatus according to claim 2, wherein the at least one application is a web-based Internet application.

5. An apparatus according to claim 2, wherein the at least one application enables individuals to add, modify or delete data.

6. An apparatus according to claim 2, wherein the at least one application enables individuals to associate identity authentication applications with the value.

7. An apparatus according to claim 2, wherein the at least one application enables individuals to associate identity authentication applications with the data record.

8. An apparatus according to claim 2, wherein the at least one application enables individuals to associate the value with the data record.

* * * * *